(12) United States Patent
Pepperling et al.

(10) Patent No.: US 6,894,659 B2
(45) Date of Patent: May 17, 2005

(54) SOLAR PANEL AND ANTENNA MOUNTED ON AN EXPLOSION-PROOF ENCLOSURE

(75) Inventors: Donald P. Pepperling, Marshalltown, IA (US); Richard J. Vanderah, Marshalltown, IA (US); Dennis G. Sickels, Marshalltown, IA (US); David C. Sanderson, Marshalltown, IA (US)

(73) Assignee: Daniel Industries, Inc., Houston, TX (US)

( * ) Notice: Subject to any disclaimer, the term of this patent is extended or adjusted under 35 U.S.C. 154(b) by 531 days.

(21) Appl. No.: 10/058,476

(22) Filed: Jan. 28, 2002

(65) Prior Publication Data

US 2003/0142033 A1 Jul. 31, 2003

(51) Int. Cl.$^7$ .................................................. H01Q 1/12
(52) U.S. Cl. ........................................................ 343/878
(58) Field of Search .................................... 343/878, 890

(56) References Cited

U.S. PATENT DOCUMENTS

| 5,350,138 A | * | 9/1994 | Culbertson et al. | 244/159 |
| 6,259,475 B1 | * | 7/2001 | Ramachandran et al. | 348/148 |
| 6,433,758 B2 | * | 8/2002 | Meguro et al. | 343/915 |

* cited by examiner

Primary Examiner—Tho Phan
(74) Attorney, Agent, or Firm—Mark E. Scott; Conley Rose, P.C.

(57) ABSTRACT

The specification discloses a system for mounting a communications antenna and a solar panel on an explosion-proof housing that does not require the use of conduit ports of the explosion-proof housing. More particularly, a mast couples to the housing by way of a prescribed number of threads, the mast having a circular cross-section and an internal cavity extending along its axis. Wires extending from inside the explosion-proof housing through the mast couple to the radio antenna and the solar panel. The void within the internal diameter of the mast not occupied by the wires for the radio and solar panel is filled with a sealing compound rated for explosive environments.

50 Claims, 3 Drawing Sheets

SOLAR PANEL AND ANTENNA MOUNTED ON AN EXPLOSION-PROOF ENCLOSURE

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to mounting of radio antennas and solar panels on explosion-proof enclosures. More particularly, the preferred embodiments are directed to mounting a radio antenna and a solar panel on an explosion-proof panel that does not negate the panel's explosion-proof ratings, and does not, in the preferred embodiments, occupy the standard conduit connections provided with the panel.

2. Background of the Invention

Electrical devices mounted in potentially explosive areas are generally required to be in explosion-proof enclosures. Potentially explosive areas may comprise locations such as hydrocarbon drilling operations, natural gas processing and transmission facilities, as well as dust-laden operations such as grain processing facilities. By mounting electrical devices in explosion-proof containers, the likelihood of an explosion caused by electrical arching, such as opening and closing of a contact or non-sealed relay device, are significantly reduced.

However, devices operating in potentially explosive environments do not necessarily operate standing alone. That is, these devices typically couple to, operate, or take inputs from devices external to the explosion-proof housing. Generally speaking, this communication with the outside world takes place through electrical conductors coupled to the external devices. These electrical conductors reach the explosion-proof enclosures through electrical conduits. Explosion-proof housings typically have only a few conduit connection ports prefabricated through the housing walls, thus making the conduit connections a limited resource (unlike enclosures that do not have an explosion-proof rating which may comprise many conduit connection knock-out locations).

An example of a location where explosion-proof housings may be used is a natural gas metering facility. In some circumstances, metering of gas may take place proximate to a stable power source and communication medium, but in some circumstances these metering facilities may be in remote locations. In remote locations, it may be necessary to power the metering equipment with batteries, the charge maintained with a solar panel array. Likewise, in these remote locations, metered information may need to be transferred to a central control facility, typically by using some form of wireless communication. Thus, the metering equipment, the radio equipment, as well as the batteries, are stored in the explosion-proof enclosure, requiring that the radio equipment and batteries couple to an antenna and solar panel, respectively, outside the explosion-proof enclosure. In the related art, coupling a radio to an antenna, whether radio frequency or satellite communication, and coupling the battery to the solar panel, each take place through a separate conduit connection port. FIG. 1 exemplifies just such an arrangement of an explosion-proof enclosure or housing 2 (having a circular cross section), a radio antenna 4 coupled at a first conduit connection port 6, and the solar panel 8 coupled to the explosion-proof housing 2 at a second conduit connection port 10. While this may be satisfactory in some installations, if any external device needs to electrically couple to the electronic device within the explosion-proof housing 2, this arrangement leaves no additional conduit connection port through which to make the electrical connection.

Thus, what is needed in the art is a way to mount a radio antenna and solar panel on an explosion-proof housing that does not require the use of the prefabricated conduit ports.

BRIEF SUMMARY OF SOME OF THE PREFERRED EMBODIMENTS

The problems noted above are solved in large part by a method and related system of mounting an antenna and solar panel to an explosion-proof enclosure that does not require the use of the prefabricated conduit ports on the panel. Preferably, an antenna mast couples to the explosion-proof housing by way of a threaded connection. To meet requirements for maintaining an explosion-proof rating, preferably at least seven mating threads connect the antenna mast to the explosion-proof housing. The mast is preferably circular in cross-section and has a bore axially there-through having an internal diameter. Electrical wires for both the solar panel and the radio antenna preferably extend from an inside cavity of the explosion-proof housing through the antenna mast. A sealing compound, preferably in the form of a water soluble powder, fills the internal diameter of the antenna mast not occupied by the wires for the radio and the solar panel forming a seal around each electrical conductor and the inside diameter of the antenna mast. This seal restricts the passage of gases, vapors and/or flames through the antenna mast. In this way, wires for the radio and the solar panel breach the wall of the explosion-proof housing without using dedicated conduit ports.

In addition to having the wires for the solar panel and the radio antenna reach the interior of the explosion-proof housing in this manner, preferably the antenna mast becomes the base structure upon which the solar panel is mounted. More particularly, a bracket structure preferably connects to the antenna mast in such a way as to be rotatable 360 degrees around the mast. A second bracket structure connects to the first bracket structure, and allows adjustment of the solar panel's inclination, to insure proper alignment with the sun given a particular latitude of installation. In the preferred embodiments, the antenna for the radio attaches to the mast at or near an upper or distal portion of the mast, and preferably the radio antenna is coaxial with the internal diameter of the mast. However, in a second embodiment, the radio antenna need not be attached to the mast, and instead may be located at a remote location with the wire feeding the antenna, preferably a coaxial cable, protruding from the upper internal diameter of the mast structure.

The disclosed methods comprise a combination of features and advantages which enable them to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiments of the present invention are directed to mounting a radio antenna and a solar panel on an explosion-proof electrical enclosure that does not use the prefabricated conduit ports typically part of explosion-proof enclosures. More particularly, the preferred embodiments were developed and will be described in the context of an explosion-proof housing containing a natural gas flow measuring computer. However, the description of the preferred embodiments directed to gas flow measurements should in no way be construed as a limitation as to the applicability of the structures and methods described.

Figure 2:
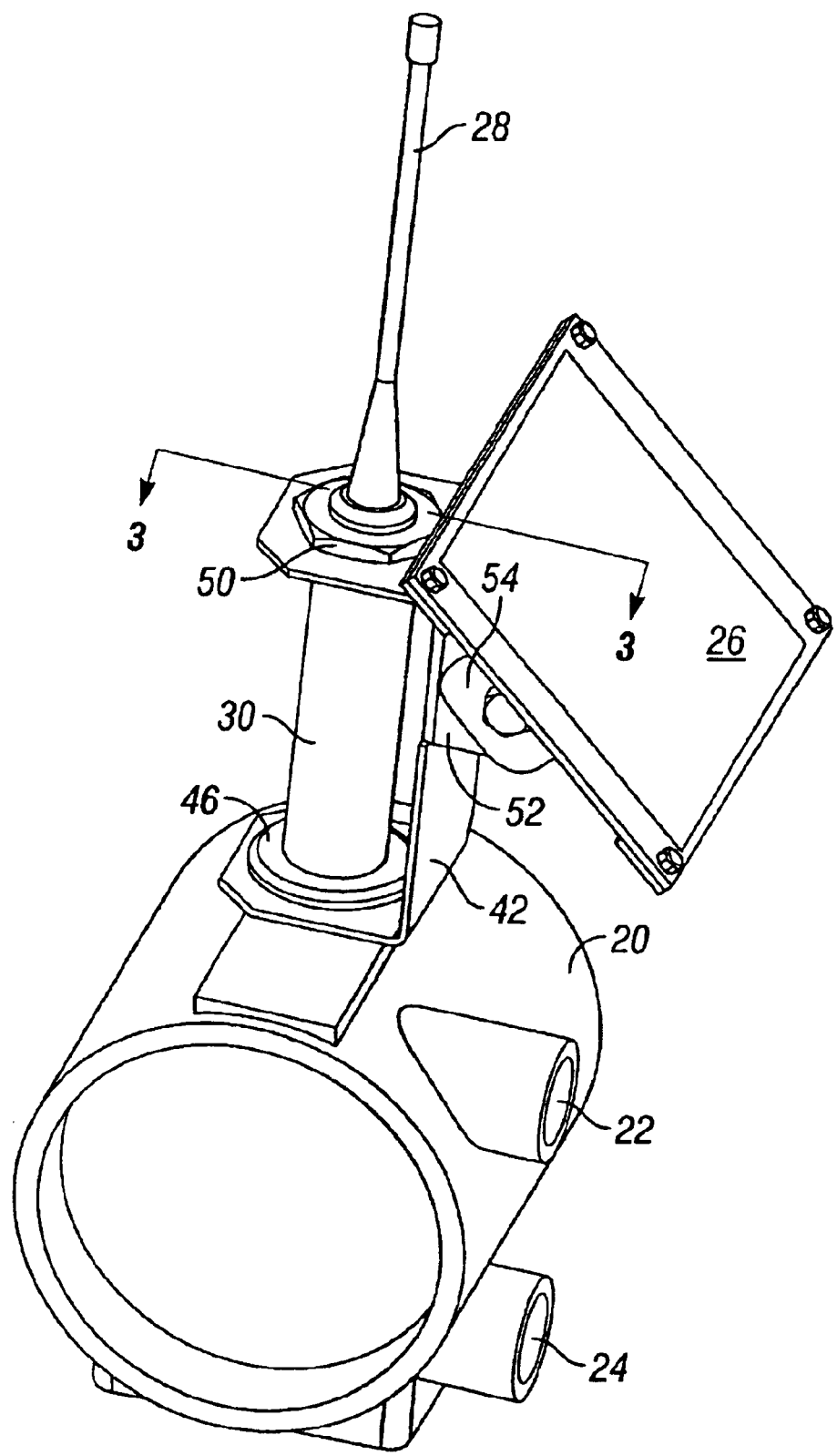
FIG. 2 shows a housing, radio antenna, and solar panel mounting system of the preferred embodiments.

Explosion-proof electrical enclosures come in many shapes and sizes. For example, some explosion-proof enclosures or housings may comprise box-type structures having a front door, a back panel, and four side walls. In the preferred embodiments the explosion-proof housings comprise tube-type structures having a substantially circular cross-section. In the preferred circular cross-section explosion-proof enclosure, electrical devices contained therein are accessible by removal of a threaded lid at one end of the circular cross-section housing. FIG. 2 shows a housing 20 of the preferred embodiment.

Whether circular or rectangular, explosion-proof electrical housings typically contain conduit ports to which conduit fittings are attached such that the devices within the housing 20, in the preferred embodiments a gas flow measurement computer, may couple to other external devices such as thermocouples, resistive temperature devices (RTD), limit switches, and the like, the electrical coupling through wires run in the conduit. FIG. 2 shows two such conduit ports 22 and 24 extending from the housing 20, which conduit ports allow communication of wires and the like to the internal cavity of the housing.

FIG. 2 also shows the preferred arrangement for connecting the solar panel array 26 and radio antenna 28 to the housing 20 by way of the mast structure 30. As is exemplified by FIG. 2, the solar panel 26 and radio antenna 28 connect to the housing 20 without using the standard conduit ports 22, 24 of the housing 20. Thus, these conduit ports 22, 24 are available for other uses. The radio antenna 28 preferably couples to the mast 30 at a distal end thereof when the mast 30 extends substantially upward from the housing 20; however, while this is the preferred arrangement, many equivalent arrangements could be made where the mast 30 does not necessarily extend in a substantially upward direction.

Figure 3:
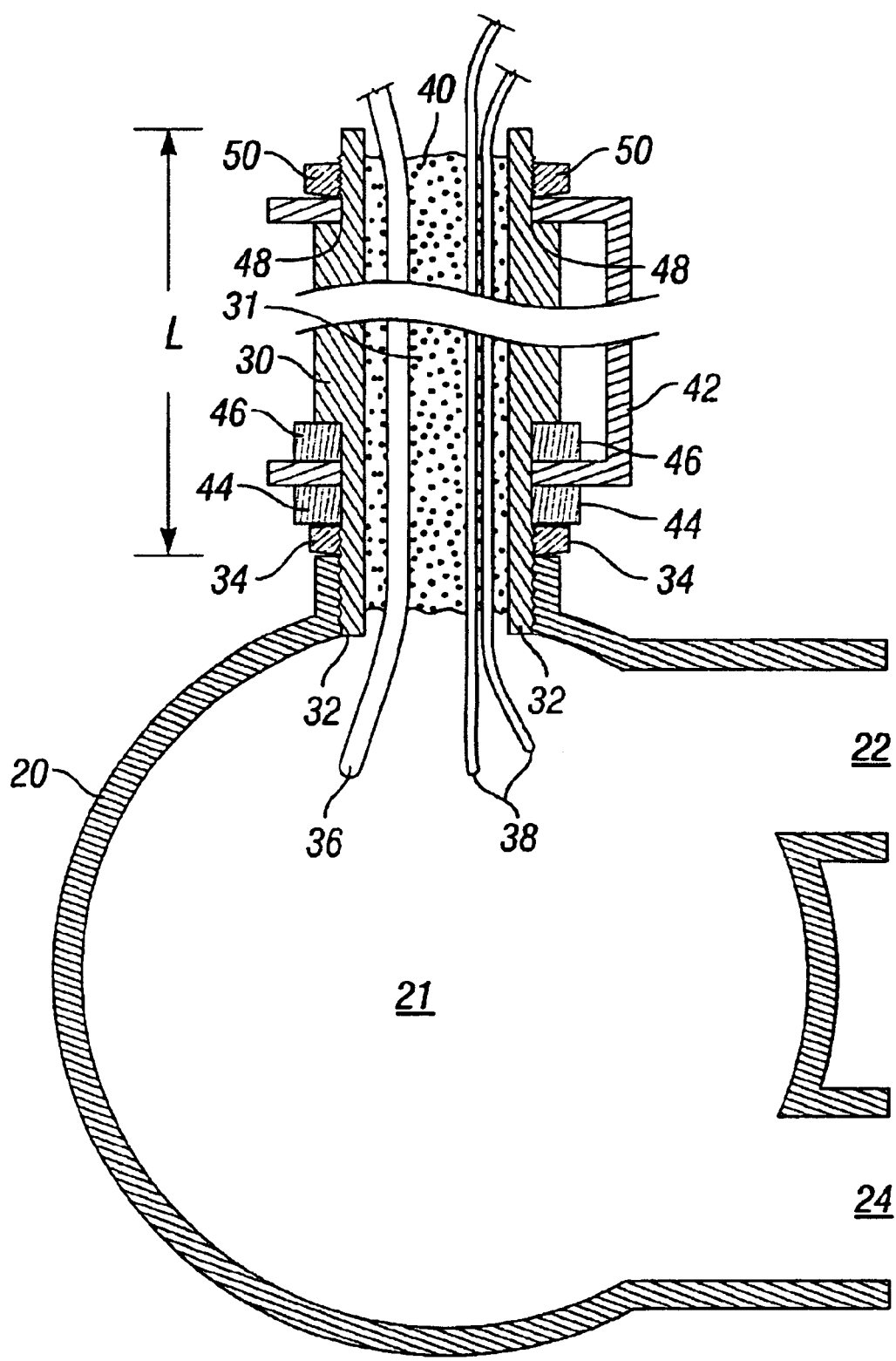
FIG. 3 shows a cross-sectional view of the mast, azimuthal bracket and housing taken substantially along line 3—3 of FIG. 2.

FIG. 3 shows a cross-sectional view of the mast 30, azimuthal bracket 42 and housing 20 taken substantially along line 3—3 of FIG. 2. In particular, the mast 30 preferably couples to the housing 20 by way of a threaded connection 32. While FIG. 3 shows the mast 30 mechanically connected at an upper portion of the housing 20, any location on the explosion-proof housing having sufficient wall thickness may be modified to accept the mast 30 structure. In order for the housing 20 to retain its explosion-proof rating, preferably the mast 30 mates with the housing 20 by a minimum number of threads and/or minimum axial engagement. The number of threads or axial engagement required to retain the explosion-proof rating is dependent upon the controlling standards agency of the particular jurisdiction of installation and the Gas Group type. For example, in installations under the jurisdiction of the Canadian Standards Association (CSA) guidelines, at least five threads of overlap between the mast 30 and housing 20 are required having a minimum axial engagement of eight millimeters (mm). Likewise, for installations under the jurisdiction of the Underwriter's Laboratory (UL), six threads are required. Because at the time of manufacture the location of installation may not be known, preferably the more stringent standard is followed. While it is preferred to threadingly connect the mast 30 to the housing 20, other suitable connections that maintain the explosion-proof rating may be used. For example, a slip fit where the amount of overlap between the mast 30 and the housing 20 is proportional to the tolerances between those two devices may be equivalently used. For additional information regarding explosion-proof enclosures, reference may be had to the CSA Guides for Explosion-Proof Enclosures (CSA C22.2 No. 30) for use in Class I Hazardous Locations. Likewise, reference may be had to the corresponding guidelines produced by the Underwriters Laboratory (UL) UL 1203. In the prototype unit of the preferred embodiment, the wall thickness at the drill and tap location for the mast was 400 thousandths of an inch, 320 thousandths of which was needed to meet the preferred seven threads of insertion of the mast 30 into the housing 20 based on the thread type and pitch.

Still referring to FIG. 3 preferably a jam nut 34 is used to lock the mast 30 into the housing 20. That is, once the mast has been mated with the housing 20 a sufficient number of threads, the jam nut 34 is tightened against the housing 20 to ensure that the mast 30 is not susceptible to rotation. More preferably still, once the jam nut is in place, a roll pin (not shown) pressed into the housing 20 through the jam nut 34 ensures no rotation of the jam nut relative to the housing.

Preferably the mast 30 is a metallic tubular structure having a circular cross-section; however, the mast may be made of any material having sufficient strength, such as dense plastics and composite materials. Thus, the mast may comprise pipe, thick wall conduit, or may be machined from larger solid pieces of material. Also preferably the masts 30 has an axial bore, or internal passage, extending its length having an internal diameter coaxial with the outside diameter of the mast. In the preferred embodiments, the wiring for the radio antenna and solar panel extend through the inside diameter of the mast 30.

FIG. 3 shows an exemplary coaxial cable 36, as well as an exemplary pair of positive and negative leads 38 for charging a battery, extending through the inside diameter 31 of the mast 30. After placement of the wires 36, 38 within the inside diameter 31 of the mast 30, the unoccupied volume of the mast is preferably sealed with a sealing compound, the compound exemplified in FIG. 3 as element 40, to ensure that the structure retains its explosion-proof rating. In particular, the sealing compound forms a seal around each electrical conductor and with the internal diameter of the antenna mast 30. This seal restricts the passage of gases, vapors and/or flames through the mast 30. In the preferred embodiments, the sealing compound is Chico® A-Sealing Compound produced by Cooper Industries, Inc./Crouse-Hines Electrical Construction materials; however, other sealing compounds are available on the market and may be equivalently used. As one of ordinary skill in the art is aware, Chico® A-Sealing Compound is a water soluble concrete-like material that hardens to produce the seal. In the preferred embodiments, the minimum length L (FIG. 3) of the mast 30 is dictated by the diameter of the mast 30. In particular, the various standards agencies prescribe a minimum ratio of the length of the pipe to its diameter, to ensure the explosion-proof qualities, e.g. UL requires 15.9 mm minimum, or the internal diameter of the pipe, whichever is greater. Other standard agencies may prescribe greater or lesser ratios, and use of these different standards for any particular device is within the contemplation of this invention.

The mast 30 creates a pathway for electrical cables, for example, the coaxial cable for the radio and a set of wires from the solar panel, to enter the housing 20, yet leaving free the conduit ports 22 and 24. In addition to this function, in the preferred embodiments the mast 30 also acts as a support for the solar panel 26 and radio antenna (see FIG. 2). As one of ordinary skill in the art is aware, solar panels need to be oriented such that their sun-receiving face points in the proper direction and has the correct inclination. Adjusting the solar panel 26 may require both an azimuthal and an inclination adjustment capability. In the preferred embodiments, an azimuthal bracket 42 rotatably connects to the mast 30 (FIG. 3). A lower end of the azimuthal bracket 42 preferably resides between two rubber grommets 44 and 46. An upper end of the azimuthal bracket 42 rides on a shoulder 48 of the mast 30, and is locked in place, after adjustment, by a jam nut 50. Referring somewhat simultaneously to FIGS. 2 and 3, azimuthal adjustments to the solar panel 26 may be made by loosening the jam nut 50, and rotating the azimuthal bracket 42 around the mast 30.

To provide inclination adjustment functionality of the preferred embodiment, the azimuthal bracket 42 has a set of wings 52 (only one of which is shown in FIG. 2, and neither of which is shown in the cross-section of FIG. 3) that connect to a complimentary set of wings 54 (again only one of which is shown in FIG. 2) of an inclination adjustment bracket connected to the solar panel 26. In the preferred embodiments, the wings 54 connect to the azimuthal bracket wings 52 by way of a nut and bolt combination on each side. By loosening the nut and bolt combination on each of the sets of wings 52, 54, the inclination of the solar panel 26 may be adjusted based on the latitude of the installation of the system. Equivalently, the wings 54 may connect directly to the solar panel 26, or may be a part of the solar panel.

Figure 1:
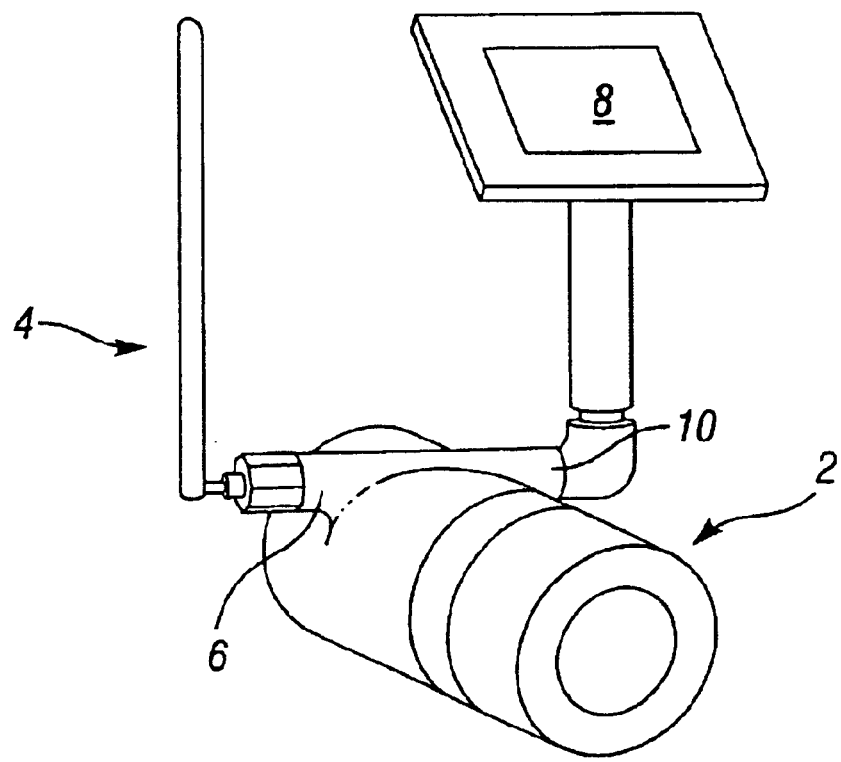
FIG. 1 shows connecting of a radio antenna and a solar panel to an explosion-proof housing using related art techniques.
Figure 4:
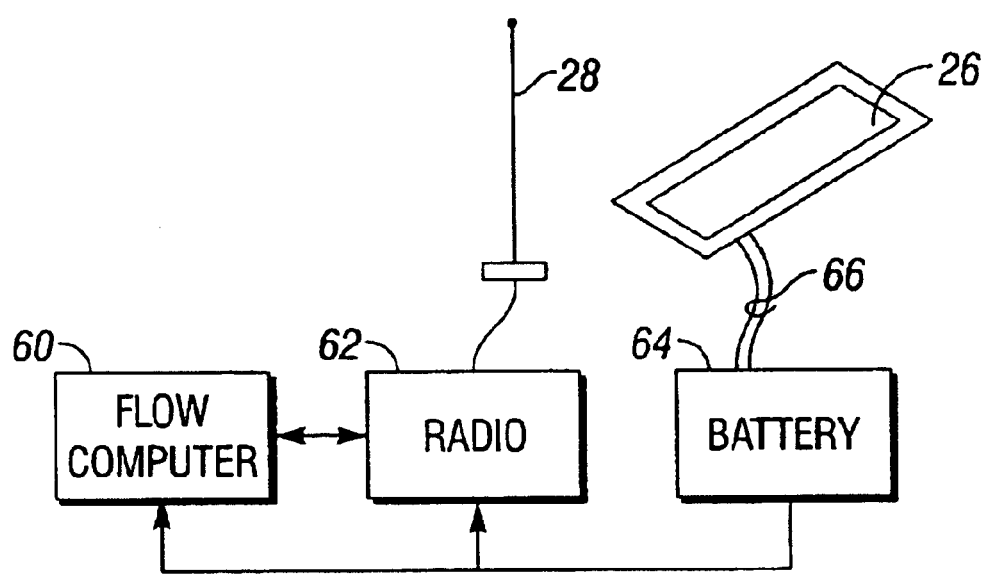
FIG. 4 shows, in block diagram form, the electronic components preferably contained within the explosion-proof housing of the preferred embodiments.

FIG. 4 shows, in block diagram form, the electrical and electronic components preferably contained within the explosion-proof housing 20. In particular, in the application in which the preferred embodiments were developed, a component within the housing 20 is the flow computer 60. The flow computer is preferably adapted to sense necessary parameters for calculating flow of gas, as well as storing historical data associated with the flow calculations. The flow computer 60 preferably couples to a radio unit 62. When the system is installed in remote locations, it is through the radio 62 that the flow computer communicates its measured gas flow parameters, and possibly receives instructions, to and from a central command, control and monitoring facility. The radio may be any suitable radio device configured in any suitable manner for communications. Preferably, the antenna 28 and radio 62 are radio frequency devices; however, any suitable electromagnetic communication device, and thus electromagnetic communication antenna, may be equivalently used, such as microwave communication devices that utilize satellites as repeaters.

Further, preferably the electronics within the housing 20 are powered by a battery 64. Because it is envisioned that the preferred embodiments will be installed in remote locations, preferably the battery 64 is charged by the solar panel 26. Thus, the battery 64 couples to the solar panel 26 by way of electrical leads 66. Any suitable solar panel 26 may be used. For installations in potentially explosive environments, standards agencies may require the solar panel to be intrinsically safe. To be rated intrinsically safe for an explosive environment, a device must not emit energy above a threshold amount during operation, and this energy limit may be in the milli-Joule range. Thus, the solar panel 26 of the preferred embodiment meets the requirements for being intrinsically safe, yet has enough charging current to keep the battery 64 operational. It is noted as well that the electromagnetic communication antenna also needs to be rated as intrinsically safe.

The above discussion is meant to be illustrative of the principles and various embodiments of the present invention. Numerous variations and modifications will become apparent to those skilled in the art once the above disclosure is fully appreciated. For example, while the preferred embodiments have been described in the context of a remotely-installed flow computer communicating with a central facility by way of radio communications, any electronic device may be placed within an explosion-proof housing with a radio antenna and solar panel mounted in the manner described, and thus would still be within the contemplation of this invention. These electronic devices may comprise pressure transmitters, thermocouple temperature transmitters, RTD temperature transmitters, dew-point monitoring devices, remote terminal units (RTU) for telemetering parameters of interest, electronic level sensors, and the like. Moreover, while the preferred embodiments were described in the context of a tubular housing 20 having a circular cross-section, substantially any explosion-proof housing may be modified to accommodate a communication antenna and solar panel as described above. Further, the preferred embodiments were described in the context of having a coaxial cable and charging wires for the solar panel extending through the internal diameter of the mast 30; however, these and other electrical connections may be made through the internal diameter 31 without departing from the scope and spirit of the invention. Moreover, while the preferred embodiments allow for 360 degrees of azimuthal rotation, an equivalent system could be made where a general direction for the antenna is selected (e.g. 90 degrees apart), and allowing for slight azimuthal rotation of the solar panel that does not have as its axis the mast. While the preferred embodiments do not utilize the conduit connection ports, there are advantages to using only a single conduit port for both the radio antenna and the solar panel, and this too is within the contemplation of the invention. It is intended that the following claims be interpreted to embrace all such variations and modifications.

What is claimed is:

1. A structure for mounting electronic devices comprising:
   an explosion-proof housing, at least one electronic device mounted within the explosion-proof housing;
   a mast mechanically connected to the explosion proof housing;
   a solar panel array mechanically connected to the mast;
   a radio antenna; and
   a plurality of wires coupled to the solar panel array and radio antenna, the wires pass through a bore axially through the mast to enter the explosion-proof housing.

2. The structure for mounting electronic devices as defined in claim 1 wherein the at least one electronic device further comprises:
   a gas flow calculation computer; and
   a communications radio coupled to the gas flow calculation computer and the radio antenna.

3. A structure for mounting electronic devices comprising:
   an explosion-proof housing, at least one electronic device mounted within the explosion-proof housing;
   a mast mechanically connected to the explosion proof housing;
   a solar panel array mechanically connected to the mast;
   a radio antenna mechanically connected to the mast; and
   a plurality of wires coupled to the solar panel array and radio antenna, the wires pass through a bore axially through the mast to enter the explosion-proof housing.

4. The structure for mounting electronic devices as defined in claim 3 wherein the mast mechanically connects to an upper surface of the explosion-proof housing, the radio antenna extending substantially upward.

5. A structure for mounting electronic devices comprising:
   an explosion-proof housing comprising a metallic cylinder having an axis therethrough, the axis oriented substantially horizontally, at least one electronic device mounted within the explosion-proof housing;
   a mast mechanically connected to the explosion proof housing;
   a solar panel array mechanically connected to the mast;
   a radio antenna; and
   a plurality of wires coupled to the solar panel array and radio antenna, the wires pass through a bore axially through the mast to enter the explosion-proof housing.

6. A structure for mounting electronic devices comprising:
   an explosion-proof housing, at least one electronic device mounted within the explosion-proof housing;
   a mast mechanically connected to the explosion proof housing;
   a solar panel array mechanically connected to the mast by way of a solar panel array mounting bracket, the solar panel array mounting bracket providing both an azimuthal and inclination orientation adjustment of the solar panel array;
   a radio antenna; and
   a plurality of wires coupled to the solar panel array and radio antenna, the wires pass through a bore axially through the mast to enter the explosion-proof housing.

7. A structure for mounting electronic devices comprising:
   an explosion-proof housing, at least one electronic device mounted within the explosion-proof housing;
   a mast mechanically connected to the explosion proof housing;
   a solar panel array mechanically connected to the mast;
   a radio antenna; and
   a plurality of wires coupled to the solar panel array and radio antenna, the wires pass through a bore axially through the mast to enter the explosion-proof housing; wherein the bore axially through the mast is sealed with a sealing material.

8. A structure for mounting electronic devices comprising:
   an explosion-proof housing, at least one electronic device mounted within the explosion-proof housing, said at least one electronic device comprising:
      a gas flow calculation computer; and
      a communications radio coupled to the gas flow calculation computer and the radio antenna;
   a mast mechanically connected to the explosion proof housing;
   a solar panel array mechanically connected to the mast;
   a radio antenna mechanically connected to the mast; and
   a plurality of wires coupled to the solar panel array and radio antenna, the wires pass through a bore axially through the mast to enter the explosion-proof housing.

9. The structure for mounting electronic devices as defined in claim 8 wherein the antenna mast mechanically connects to an upper surface of the explosion-proof housing, the radio antenna extending substantially upward.

10. The structure for mounting electronic devices as defined in claim 9 wherein the explosion-proof housing further comprises a metallic cylinder having an axis therethrough, the axis oriented substantially horizontally.

11. The structure for mounting electronic devices in explosive environments as defined in claim 10 further comprising a solar panel array mounting bracket mechanically connecting the solar panel array to the mast, solar panel array mounting bracket providing both an azimuthal and inclination orientation adjustment of the solar panel array.

12. The structure for mounting electronic devices as defined in claim 11 wherein the bore axially through the mast is sealed with a sealing material.

13. A system for housing electronic devices in potentially explosive environments, the system comprising:
   an electrical panel with an internal cavity, the electrical panel having an explosion-proof rating;
   an antenna mast mechanically connected to the electrical panel, the antenna mast having an internal passage in communication with the internal cavity of the electrical panel;
   a plurality of electrical wires extending from the internal cavity of the electrical panel through the internal passage of the antenna mast;
   a sealing compound sealing at least part of the internal passage of the antenna mast, the plurality of electrical wires extending through the sealing compound;
   a solar panel mechanically connected to the antenna mast by way of an adjustable mounting system, the solar panel also electrically coupled to at least one of the plurality of wires; and
   a electromagnetic communication antenna mechanically connected to the antenna mast, the electromagnetic communication antenna electrically coupled to at least one of the plurality of wires.

14. The system for housing electronic devices as defined in claim 13 further comprising the antenna mast mechanically connected to an upper surface of the electrical panel and extending substantially upward.

15. The system for housing electronic devices as defined in claim 14 further comprising the electromagnetic communication antenna mechanically connected to a distal end of the antenna mast.

16. The system for housing electronic devices as defined in claim 13 wherein the electrical panel further comprises a plurality of prefabricated conduit ports, and wherein the antenna mast does not couple to the prefabricated conduit ports.

17. The system for housing electronic devices as defined in claim 13 wherein the electrical panel further comprises a plurality of prefabricated conduit ports, and wherein the antenna mast utilizes only one of the prefabricated conduit ports.

18. The system for housing electronic devices as defined in claim 13 wherein the electrical panel has a substantially circular cross-section, the antenna mast mechanically connected on an upper portion of the substantially circular cross-section.

19. The system for housing electronic devices as defined in claim 13 wherein the antenna mast has a substantially circular cross-section, a length and a diameter, and wherein the length is greater than the diameter.

20. The system for housing electronic devices as defined in claim 19 wherein the ratio of the length of the antenna mast to its diameter is the greater of at least 15.9 millimeter or the internal diameter of the antenna mast.

21. The system for housing electronic devices as defined in claim 13 wherein the antenna mast is threadingly connected to the electrical panel.

22. The system for housing electronic devices as defined in claim 21 wherein the antenna is threadingly connected to the electrical panel with at least five threads and eight millimeters of axial engagement to meet explosion-proof standards.

23. The system for housing electronic devices as defined in claim 22 wherein the antenna mast is threadingly connected to the electrical panel with at least 6 threads to meet Underwriter's Laboratory (UL) explosion-proof standards.

24. The system for housing electronic devices as defined in claim 22 wherein the antenna mast is threadingly connected to the electrical panel with at least 5 threads to meet the Canadian Standards Association (CSA) explosion-proof standards.

25. The system for housing electronic devices as defined in claim 13 wherein the plurality of wires further comprises a coaxial cable and set of wires comprising a positive and negative lead from a battery inside the electrical panel.

26. The system for housing electronic devices as defined in claim 25 wherein the coaxial cable electrically couples to the electromagnetic communication antenna and the set of wires couples to the solar panel array.

27. The system for housing electronic devices as defined in claim 13 wherein the sealing compound is Chico® A Sealing Compound manufactured by Cooper Industries Inc./Crouse-Hinds Electrical Construction Materials.

28. The system for housing electronic devices as defined in claim 13 wherein the adjustable mounting system for the solar panel further comprises an azimuthal bracket mechanically connected to the antenna mast, the azimuthal bracket providing at least partial selective azimuthal rotation.

29. The system for housing electronic devices as defined in claim 28 wherein the azimuthal bracket is rotatably connected to the antenna mast.

30. The system for housing electronic devices as defined in claim 29 wherein the azimuthal bracket provides 360 degrees of azimuthal rotation.

31. The system for housing electronic devices as defined in claim 28 wherein the adjustable mounting system for the solar panel further comprises an inclination bracket mechanically connected to the azimuthal bracket and the solar panel, the inclination bracket provides at least partial selective inclination adjustment of the solar panel.

32. The system for housing electronic devices as defined in claim 13 wherein the solar panel and the electromagnetic communication antenna each have an intrinsically safe rating.

33. The system for housing electronic devices as defined in claim 13 wherein electromagnetic communication antenna is radio frequency antenna.

34. The system for housing electronic devices as defined in claim 13 wherein electromagnetic communication antenna is satellite dish.

35. A structure comprising:
   a housing means for mounting at least one electronic device in potentially explosive environments;
   a solar panel means for generating electrical energy from energy of the sun;
   an antenna means for facilitating electromagnetic communication with distant devices; and
   a mast means for mounting the solar panel means and providing a passage for wires from an internal cavity of the housing means to the solar panel means and the antenna means, the mast means mechanically connected to the housing means.

36. The structure as defined in claim 35 wherein the housing means further comprises an electrical panel having an explosion-proof rating.

37. The structure as defined in claim 35 wherein the solar panel means further comprises a solar panel array with an intrinsically safe rating.

38. The structure as defined in claim 35 wherein the antenna means further comprises an electromagnetic communication antenna.

39. The structure as defined in claim 38 wherein the electromagnetic communication antenna further comprises a radio frequency communication antenna.

40. The structure as defined in claim 39 wherein the mast means mechanically connects to an upper surface of the housing means, the radio frequency antenna extending substantially upward.

41. The structure as defined in claim 35 wherein the at least one electronic device further comprises:
   a gas flow calculation computer; and
   a communications radio coupled to the gas flow calculation computer and the radio antenna.

42. A structure comprising:
   a housing means for mounting at least one electronic device in potentially explosive environments;
   a solar panel means for generating electrical energy from energy of the sun;
   an antenna means for facilitating electromagnetic communication with distant devices; and
   a mast means for mounting the solar panel means, mounting the antenna means, and providing a passage for wires from an internal cavity of the housing means to the solar panel means and the antenna means, the mast means mechanically connected to the housing means.

43. A structure comprising:
- a housing means for mounting at least one electronic device in potentially explosive environments, said housing means comprising an electrical panel having an explosion-proof rating;
- a solar panel means for generating electrical energy from energy of the sun;
- an antenna means for facilitating electromagnetic communication with distant devices; and
- a mast means for mounting the solar panel means and providing a passage for wires from an internal cavity of the housing means to the solar panel means and the antenna means, the mast means mechanically connected to the housing means;
- wherein the electrical panel having the explosion-proof rating further comprises a cylindrical shape having an axis, the axis oriented substantially horizontally.

44. A structure comprising:
- a housing means for mounting at least one electronic device in potentially explosive environments;
- a solar panel means for generating electrical energy from energy of the sun;
- an antenna means for facilitating electromagnetic communication with distant devices;
- a mast means for mounting the solar panel means and providing a passage for wires from an internal cavity of the housing means to the solar panel means and the antenna means, the mast means mechanically connected to the housing means; and
- a mounting means for mechanically connecting the solar panel means to the mast means, the mounting means also for adjusting both the azimuthal and inclination orientations of the solar panel means.

45. The structure as defined in claim 44 wherein the mounting means further comprises an azimuthal bracket to provide at least partial selective azimuthal rotation of the solar panel means.

46. The structure as defined in claim 45 wherein azimuthal bracket is rotatably connected to the mast means, the azimuthal bracket providing substantially 360 degrees of selective azimuthal rotation of the solar panel means.

47. The structure as defined in claim 45 wherein the mounting means further comprises an inclination bracket connected to the solar panel means and the azimuthal bracket, the inclination bracket providing at least partial selective inclination adjustment of the solar panel means.

48. A structure comprising:
- a housing means for mounting at least one electronic device in potentially explosive environments;
- a solar panel means for generating electrical energy from energy of the sun;
- an antenna means for facilitating electromagnetic communication with distant devices; and
- a mast means for mounting the solar panel means and providing a passage for wires from an internal cavity of the housing means to the solar panel means and the antenna means, the mast means mechanically connected to the housing means;
- wherein the mast means further comprises a metallic cylinder having a substantially circular cross-section and having an axial bore therethrough, the axial bore providing the passage for wires from the internal cavity of the housing means to the solar panel means and the antenna means.

49. The structure as defined in claim 48 further comprising a sealing means in the axial bore to restrict the passage of gases, vapors and flames.

50. The structure as defined in claim 49 wherein the sealing means further comprises Chico® A Sealing Compound.

* * * * *